United States Patent
Kuenzi

(10) Patent No.: US 11,589,287 B2
(45) Date of Patent: Feb. 21, 2023

(54) AUTOMATIC ROUTING IN A MESH NETWORK OF WIRELESS MESSAGING DEVICES

(71) Applicant: Carrier Corporation, Palm Beach Gardens, FL (US)

(72) Inventor: Adam Kuenzi, Palm Beach Gardens, FL (US)

(73) Assignee: Carrier Corporation, Palm Beach Gardens, FL (US)

( * ) Notice: Subject to any disclaimer, the term of this patent is extended or adjusted under 35 U.S.C. 154(b) by 256 days.

(21) Appl. No.: 17/047,305

(22) PCT Filed: Apr. 23, 2019

(86) PCT No.: PCT/US2019/028703
§ 371 (c)(1),
(2) Date: Oct. 13, 2020

(87) PCT Pub. No.: WO2019/209816
PCT Pub. Date: Oct. 31, 2019

(65) Prior Publication Data
US 2021/0153098 A1 May 20, 2021

Related U.S. Application Data

(60) Provisional application No. 62/661,856, filed on Apr. 24, 2018.

(51) Int. Cl.
*H04W 40/10* (2009.01)
*H04W 40/24* (2009.01)
*H04W 84/18* (2009.01)

(52) U.S. Cl.
CPC ......... *H04W 40/10* (2013.01); *H04W 40/246* (2013.01); *H04W 40/248* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 7,382,734 B2 | 6/2008 | Wakumoto et al. | |
| 7,447,222 B2 | 11/2008 | Wakumoto et al. | |
| 7,835,333 B2 | 11/2010 | Park et al. | |
| 7,839,856 B2 | 11/2010 | Sinha et al. | |

(Continued)

FOREIGN PATENT DOCUMENTS

| | | |
|---|---|---|
| CN | 101047638 A | 10/2007 |
| CN | 104684041 A | 6/2015 |

(Continued)

OTHER PUBLICATIONS

Gundogan et al.: "draft-gundogan-icnrg-pub-iot-02 Publish-Subscribe Deployment Option for NDN in the Constrained Internet of Things", Mar. 5, 2018 (Mar. 5, 2018), pp. 1-15, XP055603842, Retrieved from the Internet: URL: https://tools.ietf.org/html/draft-gundogan-icnrg-pub-iot-02#page-5 [retrieved on Jul. 9, 2019.

(Continued)

*Primary Examiner* — Brian S Roberts
(74) *Attorney, Agent, or Firm* — Locke Lord LLP; Scott D. Wofsy; Judy R. Naamat

(57) ABSTRACT

A method of routing communication between nodes of a mesh network is provided. The method includes each node of the mesh network advertising a hop distance relative to a head of the mesh network, the hop distance being a measure of how many hops a node of the mesh network is from a head node of the mesh network, the head node being a node of the mesh network that controls all the other nodes of the mesh network.

18 Claims, 6 Drawing Sheets

(56) References Cited

U.S. PATENT DOCUMENTS

| | | | |
|---|---|---|---|
| 7,978,725 B2 | 7/2011 | Gong et al. | |
| 8,144,596 B2 | 3/2012 | Veillette | |
| 8,185,653 B2 | 5/2012 | Yau et al. | |
| 8,213,409 B2 | 7/2012 | Rudnick et al. | |
| 8,355,368 B2 | 1/2013 | Lenzini et al. | |
| 8,699,377 B2 | 4/2014 | Veillette | |
| 8,907,812 B2 | 12/2014 | Van Wyk et al. | |
| 9,043,487 B2 | 5/2015 | Retana et al. | |
| 9,509,570 B2 | 11/2016 | Joo | |
| 9,526,030 B2 | 12/2016 | Goergen et al. | |
| 9,949,204 B2 * | 4/2018 | Palin | H04L 5/0048 |
| 2003/0204623 A1* | 10/2003 | Cain | H04L 45/26 709/241 |
| 2007/0165592 A1* | 7/2007 | Gossain | H04L 45/54 370/349 |
| 2008/0095163 A1* | 4/2008 | Chen | H04W 84/18 370/392 |
| 2011/0074552 A1 | 3/2011 | Norair et al. | |
| 2019/0356573 A1* | 11/2019 | Chirikov | H04L 45/20 |
| 2020/0025629 A1* | 1/2020 | Zinger | G06F 16/9535 |

FOREIGN PATENT DOCUMENTS

| | | | |
|---|---|---|---|
| CN | 106332213 A | 1/2017 | |
| EP | 3284287 A1 | 2/2018 | |
| MY | 157257 A | 5/2016 | |
| WO | WO-09030610 A1 | 3/2009 | |
| WO | WO-09036792 A1 | 3/2009 | |
| WO | WO-12165938 A1 | 12/2012 | |
| WO | WO-17214810 A1 | 12/2017 | |

OTHER PUBLICATIONS

Cenk GUndogan et al.: "HoPP: Robust and Resilient Publish-Subscribe for an Information-Centric Internet of Things Information Centric Networking View project Internet of Things View project HoPP: Robust and Resilient Publish-Subscribe for an Information-Centric Internet of Things" Jan. 11, 2018 (Jan. 11, 2018), XP055603876, Retrieved from the Internet: URL: https://www.researchgate.net/profile/MatthiasWaehlisch/publication/322418867HoPP_Robust_and_ResilientPublish-Subscribe foranInformation-CentricInternetofThings/links/5a59ed3ca6fdcc3bfb5bfdb3/HoPP-Ro bust-and-Resilient-Publish-Subscribe-for-a n-Information-Centric-Internet-of-Things.pdf [retrieved on Jul. 9, 2019].

International Search Report and Written Opinion for PCT Patent Application No. PCT/US2019/028757, dated Jul. 23, 2019.

International Search Report and Written Opinion for PCT Application No. PCT/US201/028703, dated Jul. 23, 2019.

* cited by examiner

AUTOMATIC ROUTING IN A MESH NETWORK OF WIRELESS MESSAGING DEVICES

This Application is a 371 U.S. National Phase of International PCT Patent Application No. PCT/US2019/028703 filed on Apr. 23, 2019 which claims the benefit of U.S. Provisional Application 62/661,856 filed on Apr. 24, 2018. The entire contents of these applications are incorporated herein by reference in their entirety.

BACKGROUND OF THE DISCLOSURE

1. Field of the Invention

The present disclosure relates to the art of computing, and more particularly to automated routing in a mesh network of wireless messaging devices.

2. Description of Related Art

Bluetooth is a popular wireless communication protocol for transmitting data over short distances. Bluetooth is commonly used with today's mobile electronic devices, connecting devices such as headphones, headsets, watches, keyboard, mice, mobile phones, tablets, and sporting equipment. While the above-described devices are a one-to-one connection, there can be a desire to couple together many devices in a mesh network. Today's mesh networks can send a message from a source node to a destination node of the mesh network by either flooding the mesh with messages to nodes that are not along a route of the message, or alternatively by using a routing table. The flooding method causes an abundance of unnecessary traffic and causes nodes not included in the route to consume power. However, too much traffic can cause collisions, and energy conservation can be a priority for battery powered devices. As for the routing table method, maintaining a routing table can be a complicated solution, particularly when the mesh network is reconfigured by adding, moving, or removing nodes of the mesh network, or when a node fails. Such reconfiguration can be routine for mobile nodes of the mesh network. The routing table can be stored by a head node that controls the other nodes of the mesh network, and possibly by other nodes of the mesh network. Thus, many copies may be stored, accessed, and require reconfiguration when the mesh network is reconfigured, all of which consumes power.

To avoid the unnecessary messages, some mesh networks use different node types—some nodes are high-powered routing nodes that can handle extra messages for routing purposes. Other nodes are low-power nodes that only receive messages that are specifically to be routed to the low power node. The low-power nodes do not participate in routing of messages because of their power constraints. Additionally, a routing table may be needed to route the messages through the high-powered routing nodes.

While conventional methods and systems have generally been considered satisfactory for their intended purpose, there is still a need in the art for efficient routing in a mesh network, including to conserve energy when routing between battery powered devices.

SUMMARY OF THE INVENTION

In accordance with an aspect of the disclosure, a method of routing communication between nodes of a mesh network is provided. The method includes each node of the mesh network advertising a hop distance relative to a head of the mesh network, the hop distance being a measure of how many hops a node of the mesh network is from a head node of the mesh network, the head node being a node of the mesh network that controls all the other nodes of the mesh network.

In embodiments, the method includes selecting, by the node, a routing node, the routing node being a node of one or more nearby nodes, the at least one nearby node being included in the of the mesh network and within a distance capable of point-point communication with a node to which it is nearby and transmitting, by the node, a message to the routing node. Additionally, the method includes receiving, by the routing node, the message, and until the routing node that received the message is the head node or a destination node as indicated by identification data in the message, iteratively repeating a group of steps. The group of steps includes, selecting, by the routing node, a next routing node of one or more nearby nodes, transmitting, by the routing node, the message by the routing node to the next routing node, receiving the message by the next routing node, and if the message is received, treating the next routing node that received the message as the routing node.

In embodiments, the method further includes initializing the node in response to at least one of adding the node to the mesh network, physically moving the node relative to the mesh network, and receiving a request to reinitialize the node. The reinitializing comprises scanning, by the node, a hop distance advertised by at least one respective nearby node, determining, by the node, a minimum hop distance of the scanned at least one hop distance, and advertising, by the node, the minimum hop distance+1.

In further embodiments, the advertising, scanning, transmitting, and receiving is performed using Bluetooth protocol.

Additionally, in embodiments, the node and each routing node stores at least one of identification of the routing node to which it transmitted the message, identification of the message, and identification of the node or routing node from which it received the identified message, wherein identification of the message is at least one of a unique identifier and a topic associated with the message, wherein identification of the node is at least one of a unique identifier and a topic to which the node subscribes.

In embodiments, the second node receives a second message and determines whether identification is stored of a node from which it received a first message having an identification that matches identification of the second message. If it is determined that the identification matches, second node transmits the second message to the node or routing node from which it received the first message.

In further embodiments, the method includes each node transmitting, at least once, by each node, an initialization message that identifies the node each time the node is added to the mesh network, each time the node is physically moved relative to the mesh network, each time the node is reinitialized, or at periodic intervals.

In additional embodiments, the initialization message further includes identification of all nearby nodes and the hop distance advertised by the node.

Additionally, in embodiments, selecting the routing node by the node or selecting the next routing node by the routing node, further includes scanning to obtain a hop distance advertised by the one or more nearby nodes, and further includes selecting to be the routing node or the next routing node a node of the one or more nearby nodes based on at least one of advertisement of minimum hop distance that is lower than the node's or routing node's advertised hop distance by the nearby nodes, signal strength of advertisements by the nearby nodes and/or satisfies a load balancing criterion associated with the nearby nodes.

In further embodiments, the method further includes storing the selected routing node to which the message was successfully transmitted.

In additional embodiments, if two or more of the one or more nearby nodes have the same advertised hop distance, selecting the routing node includes selecting a node of the two or more nearby nodes that was previously selected by the node.

Additionally, in embodiments, the method further includes the routing node, at each iteration, adding identification of a node from which it received to routing information included with the message.

In embodiments, the method further includes each of the nodes of the network mesh advertising a reinitialization/configuration indicator that indicates a reinitialization and/or configuration status, receiving, by the node, a second message. The method further includes determining, by the node, if the second message received is a reinitialization or configuration update message and performing a configuration update or reinitialization process as instructed by the reinitialization or configuration update message. The method further includes updating the reinitialization/configuration indicator to indicate that the reinitialization and/or configuration status is updated.

In further embodiments, selecting the routing node includes selecting a node to be the routing node that advertises a reinitialization/configuration indicator that indicates a reinitialization and/or configuration status that is the same as the reinitialization and/or configuration status advertised by the node's reinitialization/configuration indicator.

In embodiments, the method further includes scanning and detecting, by the node, each nearby node that has a reinitialization/configuration indicator that indicates it did not perform a reinitialization or configuration update process. The node further sends at least one of the second message or a new reinitialization or configuration update message to the detected nearby nodes to trigger each of the detected nearby nodes to perform a reinitialization or configuration update process.

In additional embodiments, the method further includes receiving, by a head node of the mesh network from the respective nodes of the mesh network, an initialization message. The initialization message includes identification of the node, the hop distance of the node, and identification of all nodes determined to be nearby nodes of the node, the head node being a node of the mesh network that controls all the other nodes of the mesh network. The method further includes calculating using the initialization messages received, by the head node, an optimal route using the initialization messages received from at least one of the head node to a selected node of the mesh network or from a first node to a second node of the mesh network.

Additionally, in embodiments, the destination node is identified by the message or is the head node. Selecting the routing node by the node or selecting the next routing node by the routing node further includes selecting to be the routing node or the next routing node, a node of the one or more nearby nodes that advertises a hop distance that is lower than the node's or routing node's advertised hop distance.

In accordance with another aspect of the disclosure, a node of a mesh network having a plurality of nodes is provided. The node includes a memory configured to store instructions, and a processor in communication with the memory. The processor, upon execution of the instructions, is configured to advertise a hop distance relative to a head of the mesh network, the hop distance being a measure of how many hops a node of the mesh network is from a head node of the mesh network, the head node being a node of the mesh network that controls all the other nodes of the mesh network. The processor, upon execution of the instructions, further configured to determine whether a nearby node is disposed upstream or downstream relative to the node based on the node's advertised hop distance and a hop distance advertised by the nearby node. The nearby node is included in the mesh network and disposed within a distance capable of point-point communication with the node. An upstream position is indicated when the nearby node has a lower hop distance than the node, and a downstream is indicated when the nearby node has a hop distance that is higher than the node.

In further embodiments, the processor, upon execution of the instructions, is further configured to receive a message, and unless the node is a destination node of the message as indicated by identification data in the message, select a next routing node of one or more nearby nodes. Additionally, the processor, upon execution of the instructions, is further configured to transmit the message to the next routing node.

In still a further aspect of the disclosure, a non-transitory computer readable storage medium and one or more computer programs embedded therein is provided. The computer programs include instructions, which when executed by a computer system, cause the computer system to advertise a hop distance relative to a head of the mesh network, the hop distance being a measure of how many hops a node of the mesh network is from a head node of the mesh network, the head node being a node of the mesh network that controls all the other nodes of the mesh network. The computer program instructions, when executed by the computer system, further cause the computer system to determine whether a nearby node is disposed upstream or downstream relative to the node based on the node's advertised hop distance and a hop distance advertised by the nearby node, wherein the nearby node is included in the mesh network and disposed within a distance capable of point-point communication with the node, an upstream position is indicated when the nearby node has a lower hop distance than the node, and a downstream is indicated when the nearby node has a hop distance that is higher than the node.

In embodiments, the computer program instructions, when executed by the computer system, further cause the computer system to receive a message, and unless the node is a destination node of the message as indicated by the message, select a next routing node of one or more nearby nodes that has an advertised hop distance that is lower than the routing node's advertised hop distance. Additionally, the computer program instructions, when executed by the computer system, further cause the computer system to transmit the message to the next routing node.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

As described above, Bluetooth is a wireless protocol commonly used to couple electronic devices together. These electronic devices commonly are mobile devices and/or use batteries to power the Bluetooth connectivity. While some embodiments are described herein with respect to Bluetooth and the use of advertisements for communicating information between nodes, it should be understood that embodiments can be used with any type of wireless messaging protocol, such as WiFi, Zigbee, Z-Wave, or any wireless protocol currently in existence or developed in the future, using that wireless messaging protocol's methodology for communicating information between the nodes.

Figure 1:
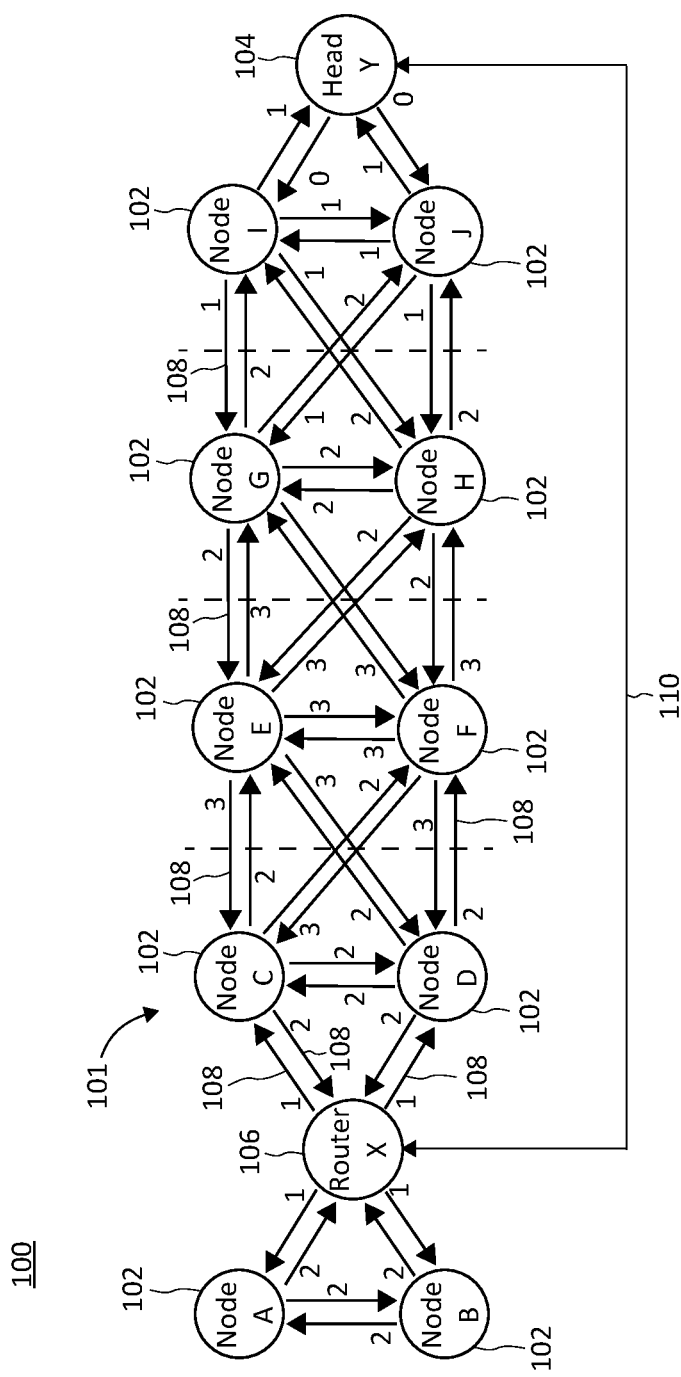
FIG. 1 is a schematic diagram illustrating the operation of one or more exemplary embodiments.

Reference will now be made to the drawings wherein like reference numerals identify similar structural features or aspects of the subject disclosure. For purposes of explanation and illustration, and not limitation, a schematic diagram of an exemplary embodiment of a mesh network in accordance with the disclosure is shown in FIG. 1 and is designated generally by reference character 100. Other embodiments of a mesh network in accordance with the disclosure, or aspects thereof, are provided in FIGS. 2-7, as will be described.

Mesh network 100 includes a plurality of nodes 101. Nodes 101 include mesh nodes 102 (also referred to as mesh nodes A-J), head node 104 (also referred to as head node Y) and a router node 106 (also referred to as router node X). When needed, each mesh nodes A-J, router node X, and head node Y can function in the roles of a source node, a destination node, or a routing node, changing functions as needed. Additionally, the nodes 101 can operate in advertising or scanning modes. For example, when using Bluetooth, e.g., Bluetooth low energy (BLE) as the wireless messaging protocol, the nodes 101 operate as peripherals when using an advertising mode, and operate as centrals when using a scanning mode. Each of the nodes 101 can be considered a "peer." Thus, the mesh network 100 can be considered a peer-to-peer network.

With reference to router node X, router node X may have capabilities that nodes A-J do not have, such as the capability of router node X to connect to another network that is different than network 100. For example, router node X may connect to a Wi-Fi network or wired LAN network in order to communicate directly to head node Y. Communication via the other network may consume a greater amount of energy than is needed for communication via network 100. Accordingly, whereas nodes A-J may be devices that are powered by a battery having a limited power supply, router node X may have a stronger power supply than nodes A-J. When operating as routing nodes, router node X may have a similar routing as nodes A-J.

It is noted that the term "routing node" refers to any node 101 of the network 100 that is operating in a routing mode, and is differentiated from router node 106 (i.e., router node X), which is a particular node of the network 101 provided with a direct connection to the head node Y. In an embodiment, the direct connection to head node Y may be through a socket connection over an IP network where messages are sent directly from node X to head node Y and back. In another embodiment the node X and head node Y may use a web or internet based protocol to connect directly to each other, for example a REST API over an HTTPS connection. In another embodiment the direct connection to head node Y may be through an intermediary service, such as a publish/subscribe service where a message can be published on a topic to a subscriber who is listening to a topic and in this case node X and head node Y can publish and subscribe to message topics directed to and from each other. Further, the intermediary service may be hosted in the cloud where messages are then relayed to and from head node Y to node X. The concept of publishing and subscribing can further be used by nodes A-J as well as described in further detail below.

With reference to operation of head node Y as a routing node, in embodiments each node A-J and router node X initiates and sends an initialization message to the head node Y. During the sending of this initialization message, the route the initialization message takes (also referred to as initialization route information) is recorded and transmitted along with the initialization message. Head node Y receives each of the initialization messages with the initialization route information from the last node 101 of the respective route. Initialization route information for each initialization message is collected by the head node Y and stored in association with the node 101 that initiated the initialization message.

In embodiments, each time a first node of nodes A-J or X sends a message to a second node of nodes A-J or X, the message, including the target destination (which identifies the second node) is automatically transmitted from the first node upstream toward the head node Y by following an upstream path. The message may be received by the second node if it is along an upstream path followed by the message. Otherwise, the message is received by the head node Y. Head node Y uses the target destination included with the message to retrieve the initialization route information associated with the second node from its stored initialization route information stored for they nodes 101 of the network 100. Head node Y then sends the message with the retrieved initialization route information to the last node 101 of the route as indicated by initialization route information. The message is routed in the reverse order along the route indicated by the initialization route information until it arrives at the second node. In essence, the message is provided with an individualized routing table that is used to route the message itself.

Each of the nodes 101 periodically advertises a hop distance relative to the head node Y, such as by operating in the advertising mode. The hop distance is a measure of how many hops the node 101 is from the head node Y. The head node Y is a node 101 that controls all the other nodes 101. Advertising refers to the nodes 101 sending out an advertisement via an advertisement signal 108 that other nodes 101 in the mesh network 100 can detect and read by scanning. The advertisement can include a small amount of information. When using the advertising mode, the peripheral can use a generic access profile (GAP) to send out the advertisement at a steady rate, for example, 1 advertisement per second. The rate for sending out the advertisement should be fast enough to be useful, but slow enough to conserve energy consumption by nodes 101 that are battery powered devices.

When using the scanning mode, a node 101 can detect and read an advertisement signal 108 of nearby nodes 101. Nearby nodes 101 are other nodes 101 that are within a scanning range of the node 101, meaning they are within a distance capable of point-point communication with the node to which they are nearby.

The disclosure describes, as an example, the nodes 101 operating in a Bluetooth enabled scanning mode and advertising mode to discover and communicate with nearby nodes 101 as an example, however the disclosure is not limited to Bluetooth or scanning and advertising modes. The disclosure encompasses other wireless network protocols that use different methodologies for each node 101 to have the capability to determine its own distance (which can be expressed as number of hops or another measurement) from the head node 104, and to determine the distance of nearby nodes 101 from the head node 104. Using this knowledge, a particular node 101 can determine whether a nearby node 101 (meaning a node 101 that is nearby the particular node 101) is upstream or downstream relative to the particular node. While Bluetooth is used as an example wireless network protocol, the examples provided can also be implemented using different wireless network protocols.

Accordingly, when a node 101 is described as advertising a hop distance, the term "advertising" refers to communicating the hop distance to at least one other node without being limited to a particular methodology or wireless network protocol. When a node is described as scanning a hop distance, the term "scanning" refers to requesting, receiving, reading, retrieving and/or otherwise obtaining the hop distance without being limited to a particular methodology or wireless network protocol. In embodiments, advertising and scanning are performed using Bluetooth protocol.

A node 101 can use the hop distance advertised by nearby nodes 101 to determine its own hop distance, such as during an initialization, configuration, or reinitialization process. The node 101 can also use the hop distance advertised by nearby nodes 101 to select a node 101 to function as a routing node for routing a message through the mesh network 100, as described in greater detail below.

A reinitialization process can be triggered, for example, by a reinitialization instruction message from the head node 104, whenever a reconfiguration occurs, or at regular intervals. During a reinitialization process, a node 101 can erase temporarily stored information from its memory, such as its own hop distance, identifications and hop distances of nearby nodes or a selected nearby node, and identification of a message. The reinitialization process can include re-initializing the node (performing an initialization process) to determine its hop distance.

Reinitialization can be triggered in several scenarios. In one scenario, a downstream broadcast is sent to all nodes 101 that indicates that all of the downstream nodes 101 need to reinitialize.

In another scenario, a first node 101 attempts to send a message to a second node 101, but the second node 101 is no longer available. The first node may have used a stored result from a previous scan from some time period back that included the second node as an available nearby node. On the failure to send the message, the first node can initiate a reinitialization process to reinitialize its own hop distance.

In another scenario, a node 101 that is added to the network 100 or reinitialized may send a reinitialization instruction message to all of its nearby nodes to indicate that node 101 was just added to the network 100. In this way, each node that performs a reinitialization process can propagate a reinitialization instruction message to other nodes 101 that have not yet reinitialized.

In embodiments, an advertised (or otherwise communicated) hop distance can include an additional parameter, such as a reinitialization flag, to indicate whether the node has recently reinitialized or not. For example, the reinitialization flag can be initially set to '0'. Before a reinitialization process, all nodes 101 advertise a reinitialization flag of '0'. When one of the nodes 101 reinitializes, its reinitialization flag is toggled to '1.' The node 101 then sends a reinitialization instruction message to each of its nearby nodes that have reinitialization flags currently set to '0' to reinitialize also. Each of the nearby nodes then reinitializes and toggles their respective reinitialization flags to '1'. The reinitialization process then propagates through the network 100 until all nodes 101 have reinitialized. A future reinitialization process may then utilize the flag by toggling it back to 0 or to some other value to indicate the status of the future reinitialization process.

To prevent constant reinitialization of nodes 101, the head node 104 can control the reinitialization process, such as by using one of at least a broadcast message and a specified reinitialization flag. A configuration update process occurs when a node 101 receives a configuration update message that originated from the head node 104. A configuration update process can include updating software using software provided via the configuration update message. The software updated can include application data used by the node 101. The application data can provide the node 101 with a particular functionality. For example, if the node 101 is a lock, then the application data can include data that configures the node 101 to operate as a lock based on control parameters. The configuration update process can include updating the control parameters. In another example, if the node 101 is a digital sign, then the application data can provide the node 101 with a particular functionality to display particular information on the sign. The configuration update process can include updating the information to be displayed. Additionally, the configuration update process can include a reinitialization process.

An initialization process occurs when a mesh node 102 is added to the mesh network 100 or moved within the mesh network 100. During an initialization process the mesh node 102 scans a hop distance advertised by at least one respective nearby node. By scanning, the mesh node operates as a central and uses its scanning mode to detect and read an advertisement signal of nearby nodes. The mesh node 102 determines a minimum hop distance of the hop distances that it scanned and calculates its own hop distance to be the minimum hop distance determined+1. The mesh node 102 can now advertises its own hop distance. By increasing its hop distance by 1, the mesh node 102 can position itself upstream relative to its nearby nodes 101, since the nearby nodes 101 now have a smaller hop distance than the mesh node 102. The mesh node 102 can also send an initialization message to the head node 104 by sending the initialization message to an upstream node.

As shown in FIG. 1, nodes E and F have hop distances=3, nodes A, B, C, D, G, and H have hop distances=2, nodes I, J and the router node X have hop distances=1, and the head node Y has a hop distance=0.

When a node 101 wants to deliver a message, it selects a routing node and transmits the message to the routing node. When a node 101, for example node E at hop distance of 3, is sending a message upstream in a direction that is towards the head node 104, the routing node is selected from one or more nearby nodes that have an advertised hop distance that is lower than the node's advertised hop distance, for example from the set of C, D, G, H all at hop distance of 2.

Selection of the upstream routing node from a set of nearby nodes that have an advertised hop distance that is lower than the node's advertised hop distance can also be random or based on other factors, such as prior success in transmitting messages to previously selected nearby nodes and/or signal strength or one or more load balancing criteria, such as the percentage of memory used in the nearby node or such as the percentage of possible routes or topics managed by the nearby node, differences in energy available in the nearby nodes, or differences in path latency in the nearby nodes. The purpose of load balancing is to optimize the use of the whole network of nearby nodes to spread out the energy consumption and to spread out the message routing so that as much as possible a nearby node is not burdened, for example with poor battery life performance. For example, nearby nodes that transmit an advertisement signal that is below a predetermined signal threshold can be eliminated if other nearby nodes are available that transmit an advertisement signal above the signal threshold. Further to the example above, node E, for example, can spread its routing requests between the set of C, D, G, H so that all nodes in the network are utilized and one node is not burdened with routing all the messages and consuming more than its share of energy.

When sending a message downstream, in a direction away from the head node 104, the routing node is selected from one or more nearby nodes that have an advertised hop distance that is higher than the node's advertised hop distance. Additionally, when sending in the downstream direction the node may be selected based on information included in additional data included with the message, such as a topic or routing information. In embodiments, if the routing node subscribes to a topic that is identified in the message, the routing node can be selected. In embodiments, if the routing node is identified by the routing information, the routing node can be selected. The message can be sent upstream from any mesh node 102 A-J to the head node Y without the use of a routing table. Additionally, when mesh nodes 102 or router nodes 106 are added, moved, removed, or fail, the remaining mesh nodes 102 and router nodes 106 can automatically adapt to the change by refreshing the hop distances that they advertise.

A mesh node 102 can determine to send a message for a variety of reasons. For example, data in the message to be sent might originate with the mesh node 102. In another example, the mesh node 102 can receive a message from another node 101 and desire to forward the data to another node 101 in the mesh network.

The terms "data," "information," and "message" are used interchangeably herein but essentially mean the same thing, however more specifically a message contains data that encodes information. The message is transferable from one node 101 to another. The data can be processed by a receiving node 101 to determine the information. In addition to a message containing data, the message may contain additional data that is an indication of the source node, destination node, routing information (including identification of routing nodes that route the message from the source node to the destination node), introduction route information, priority information, message integrity information, message topic, or other information typically transferred in a digital message. Data contained in messages may be encrypted using various methods well known in the art of message delivery. When a node 101 has data to send, it can determine a destination node. The additional data contained in the message can be used to determine the destination node. The destination node can be the head node 104 or a different mesh node 102. If the node 101 is not the destination node, it becomes a routing node and sends the message to a nearby node of the mesh nodes 102. The nearby node can be selected based on its hop distance for sending the message upstream (which would be to the head node 104, an upstream mesh node 102, or an upstream router node 106), if it indicated as the target destination, or based on routing information included with the additional data contained in the message. Selection of a nearby node based on its hop distance can occur when the node 101 does not know the target destination and is merely sending the message upstream towards the head node 104, or the target destination is the head node 104. Selection of a nearby node based on its hop distance includes selecting a nearby node that has a hop distance smaller than the hop distance of the node 101. The additional data can include identification data that includes at least one of a unique identifier and a topic associated with the message.

When a node 101 is added to or moved within the mesh network 100, it can transmit an initialization message to the head node 104. As described in greater detail below, the initialization message can include initialization route information included in the additional data contained in the initialization message. As the initialization message is routed to the head node 104, the identity of each node 101 along the route travelled by the initialization message can be added to the initialization route information included in the initialization message's additional data. Identification of a node 101 can be at least one of a unique identifier and a topic associated with the node 101 by virtue of the node subscribing to the topic. The head node 104 can be any type of device that is used to communicate with each of mesh nodes 101. In some embodiments, the head node 104 can include database capabilities, in order to store data transmitted by mesh nodes 101. In some embodiments, the head node 104 can include programming capabilities such that head node 104 can produce instructions for any one of mesh nodes 101. Head node 104 can be embodied as a laptop computer, a desktop computer, a server, a cloud, a mobile electronic device, or any other type of computing device. Head node 104 can also have communication capabilities for communicating with other networks and/or with other devices external to the mesh network 100, such as router node X, which can use a high-speed network, such as a LAN, WiFi, etc., to communicate directly with the head node Y. In some embodiments, the head node 104 can create and/or maintain a routing table that determines a best route for sending a message from a source node of nodes 101 to a destination node of nodes 101. The source node can be the head node 104. If the source node is a different node, the head node 104 can determine a first route for sending the original message from the source node to the destination node, and insert the first route into a route message. The head node can further determine a second route from the head node 104 to the source node, and send the route message to the source node via the second route. The head node can instruct the source node to send the message to the destination node, or the source node can send a message to the head node requesting a route for sending the message to the destination node. The head node 104 can also broadcast messages to the mesh nodes 102, such as to update a configuration, request a status message, or request a reinitialization operation, without limitation. A broadcast message can be sent to all downstream nodes. A node 101 that has received a broadcast message from an upstream node can in turn send this message to all downstream nodes of the node 101.

The mesh network 100 can optionally include one or more router nodes 106. Each router node 106 communicates directly with the head node 104 via a communication path 110 that can be external to the mesh network 100. Communication path 110 can be for example a wired path or a wireless path (e.g., WiFi). Due to the direct communication between the router node 106 and the head node 104, the hop distance advertised by the router node 106 is 1. The router node 106 does not typically serve as a source node or a destination node. The routing node is generally powered by a continual power source and is highly available and ready to route a message.

In an example application, the nodes 101 can have a second communication function, such as to communicate with a mobile device. The second communication can use Bluetooth protocol, and can be independent of the mesh network communication. For example, each mesh node 102 can be a lock of a door (also referred to as a door lock), and the mobile device can be a mobile phone that is authorized to open a particular door lock.

With reference now to FIGS. 2-6, shown are flowcharts demonstrating implementations of various exemplary embodiments. It is noted that in embodiments, the order of operations shown in FIGS. 2-6 is not required, so in principle, the various operations may be performed out of the illustrated order or in parallel. Also, in embodiments, certain operations may be skipped, different operations may be added or substituted, or selected operations or groups of operations may be performed in a separate application following the embodiments described herein.

Figure 2:
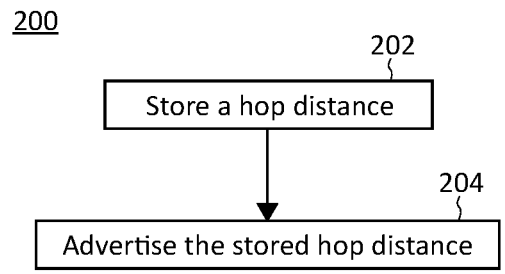
FIG. 2 is a flowchart showing example operations performed by a mesh network and its nodes in accordance with embodiments of the present disclosure.

FIG. 2 shows a flowchart 200 of example operations of a method performed by a node of a mesh network, such as a node 101 of network 100 shown in FIG. 1.

At operation 202, the node stores a hop distance, and at operation 204, the node advertises its stored hop distance. If the node is a head node, such as head node 104 shown in FIG. 1, the head node is configured to store a hop distance=0. If the node is a router node, such as router node 106 shown in FIG. 1, the router node 106 is configured to store a hop distance=1. If the node is a mesh node, such as mesh nodes 102 shown in FIG. 1, the mesh nodes determine their hop distance using an initialization method shown in FIG. 3.

Figure 3:
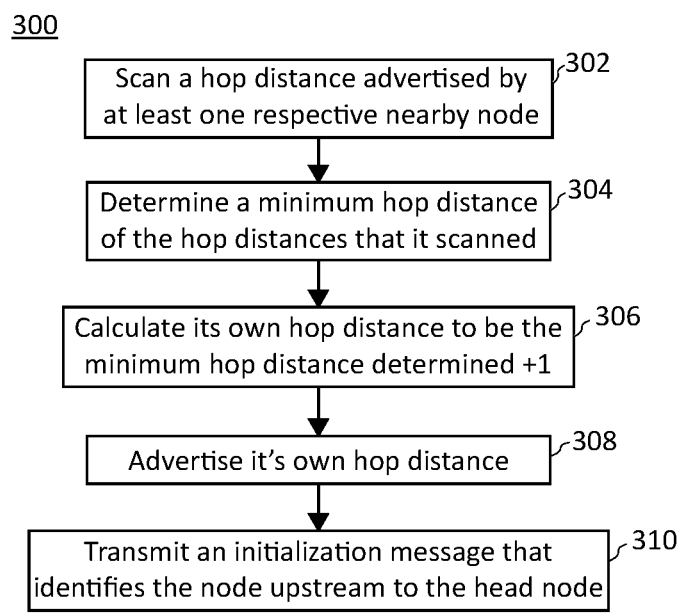
FIG. 3 is a flowchart showing example operations performed by the mesh network and its nodes in accordance with embodiments of the present disclosure.

FIG. 3 shows a flowchart 300 of example operations of a method performed by a mesh node of the mesh network when being initialized (which is intended to include reinitialization) in the mesh network, such as in response to, for example and without limitation, adding the mesh node to the mesh network, physically moving the mesh node relative to the mesh network, and receipt of a request to reinitialize the mesh node.

At operation 302, the mesh node scans a hop distance advertised by at least one respective nearby node. By scanning, the mesh node operates as a central and uses its scanning mode to detect and read an advertisement signal of nearby nodes. If no nearby nodes are found, the mesh node can delay for a time period and then retry operation 302. The delay may be useful during a power up operation and account for a time period when other nodes may be powering up nearby. This may also be useful for nodes that are mobile and may move in or out of communication range for scanning.

At operation 304 the mesh node determines a minimum hop distance of the hop distances that it scanned. At operation 306, the mesh node calculates its own hop distance to be the minimum hop distance determined+1. At operation 308, the mesh node advertises its own hop distance.

Once operation 308 is performed, the mesh node is now advertising its hop distance and other mesh nodes can detect and read its hop distance and use it to determine their own hop distance. The node can now be selected by another mesh node to be a routing node. This node can now determine an upstream or downstream direction in the network of other nodes by comparing their hop distances to its own hop distance.

In one example, when node A is first initialized, at operation 302 it scans mesh node B and router node X as nearby nodes and detects and reads the hop distances advertised by the scanned nodes. Mesh node B advertises a hop distance of 2 (as indicated by its outgoing advertisement signal 108), and router node X advertises a hop distance of 1. Depending on the physical proximity between the nodes, it may even detect other nodes 101 as nearby nodes, such as nodes C and D or even nodes E and F, having hop distances 2, 2, 3, and 3, respectively. At operation 304, mesh node A determines the minimum hop distance to be 1. At operation 306, mesh node calculates its own hop distance to be 2, and stores this setting. At operation 308, mesh node A advertises its own hop distance, which is 2.

In embodiments, at operation 310, optionally, the mesh node transmits an initialization message, that identifies the node, upstream to the head node. In embodiments, the initialization message can further include identification of all nearby nodes and the hop distance advertised by the node. In embodiments, the initialization message can also include initialization route information that describes the route traveled by the initialization message from the mesh node to the head node. The head node can use the information transmitted by each of the mesh nodes at the times of their respective initializations to select a route for a message being sent downstream from the head to a destination node, or from a different node to a destination node.

In embodiments, operation 310 can be replaced with an alternative method in which a topic identifier is included in a subscription message. The topic identifier identifies a topic rather than a target destination. The subscription message can be transmitted by a mesh node at initialization (in addition to or combined with an initialization message), reinitialization (in addition to or combined with a reinitialization message), or reconfiguration. The subscription message is transmitted to the head node via an upstream route. Along the way, each node records information that can be used for routing future messages, for example the subscription topic id and which downstream node is subscribing, which upstream node the subscription request was routed through towards the head node, and which node was the originating node that subscribed to the topic. Later, when a message is published by the head node on a certain topic, the message is routed on a downstream path by each node along the path that knows who is subscribing to the certain topic from one hop downstream and the node looks up this information and then sends it downstream one hop towards the original subscribing node. That next node then looks up the information and sends it further on until the original subscriber to the 'topic' is received as the destination node.

Figure 4:
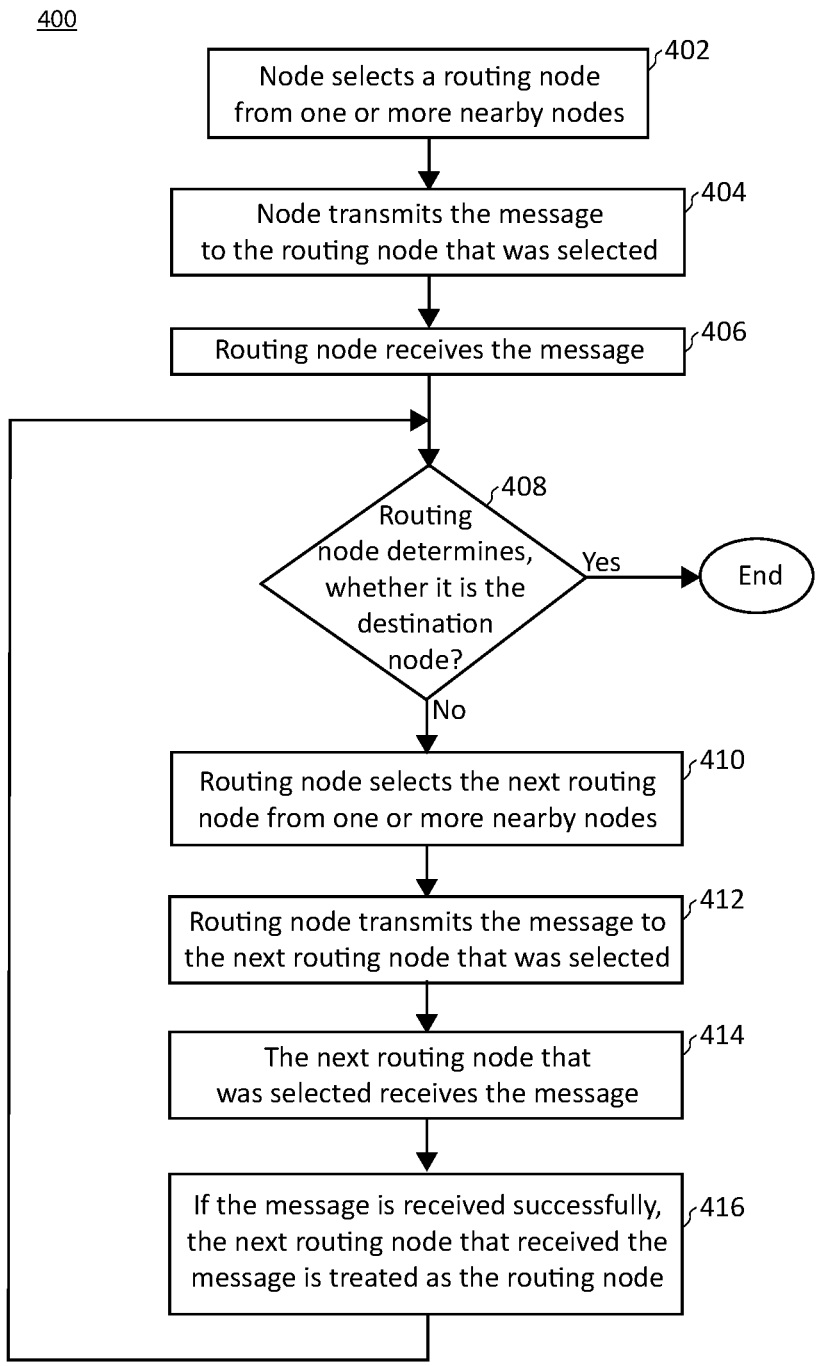
FIG. 4 is a flowchart showing example operations performed by the mesh network and its nodes in accordance with embodiments of the present disclosure.

FIG. 4 shows a flowchart 400 of example operations of a method performed by nodes of the mesh network when transmitting a message upstream, meaning in a direction toward the head node, or downstream, meaning in a direction away from the head node. The message may originate with the first node that transmits, or the message may be on route from a previous node.

At operation 402, the node selects a routing node from one or more nearby nodes. In embodiments, the nearby nodes can be previously detected and stored. Additionally, in embodiments, the selected nearby nodes can be previously selected and stored. Accordingly, the node accesses the stored nearby detected nodes and/or selects the stored selected node.

In embodiments, the nearby nodes are detected (such as by scanning) and/or a node is selected from the nearby nodes. The selection can be random or based on factors, such as previous selections and/or signal strength and/or the number or percentage of routes managed or topics subscribed and/or memory available or CPU load or other factors that can distribute the routing of messages across multiple nodes so that battery powered nodes can share routing load.

In embodiments, in which the node is transmitting upstream, an upstream node of the nearby nodes is selected, wherein the upstream node has an advertised hop distance that is lower than the node's advertised hop distance.

In embodiments, when transmitting downstream, the node selects a routing node that is identified by the message, either based on a topic or routing information included with the message. In embodiments, if the routing node subscribes to a topic that is identified in the message, the routing node can be selected. In embodiments, if the routing node is identified by the routing information, the routing node can be selected. At operation 404, the node transmits the message to the routing node that was selected. In embodiments, when transmission of the message to the previously selected node fails, operations 402 and 404 can be repeated.

In embodiments, the node may store an identification of the message or additional data included with the message, such as an indication of the source node, destination node, routing information (including routing nodes that route the message from the source node to the destination node), priority information, message integrity information or other information typically transferred in a digital message. In embodiments, the node stores identification of the selected node to which it transmitted the message. In embodiments, the stored selected node can be selected the next time the node transmits a message upstream.

In embodiments, the node may add to the additional data included with the message its identification or identification of a node from which it received the message. In this way the message can include a list of nodes that transmitted the message. Each node that receives the message or transmits the message can add its identification to the list. The list shows the route that the message took as it was transmitted to its destination node. Any node that receives the message can store the list and use it to send a message to any of the nodes that transmitted the message through its route. In this way each node can store a routing table that is built by the node as it operates as a routing node.

In order to limit the amount of information stored due to storage capacity limitations and for power conservation, the information stored by the node can be stored for a limited time period, such as set to expire and be deleted at the end of the time period or be purged during a reinitialization or configuration update process. At operation 406, the routing node receives the message.

At operation 408, the routing node determines whether it is the destination node of the message. The destination node can be indicated by the message, such as by an identification (e.g., address of the destination node, such as MAC address, or by a topic identifier), or if no indication is provided, the destination node is the head node. If the determination at operation 408 is YES, meaning the routing node selected is the destination node, the method ends. If the determination at operation 408 is NO, meaning the routing node selected is not the destination node, the method continues at operation 410.

At operation 410, the routing node selects the next routing node from one or more nearby nodes. This operation is performed similarly to operation 402. At operation 412, the routing node transmits the message to the next routing node that was selected. This operation is performed similarly to operation 404. For example, in embodiments, the routing node may add to the additional data included with the message its own identification and/or identification of the node from which it received the message. Any upstream node that later has a different message to send, such as during a downstream routing of the different message, can store the list from the information added at operation 412 and use it to send the different message downstream to any of the nodes that transmitted the message through its route. At operation 414, the next routing node that was selected receives the message. In embodiments, the routing node may store an identification of the message or additional data included with the message.

At operation 416, if the message is received successfully, the next routing node that received the message is treated as the routing node. The method continues by returning to operation 408 and iteratively repeating operations 408-416 until it is determined at operation 408 that the routing node that received the message is the destination node of the message.

In embodiments, when a node or a routing node receives a message that is being transmitted in an upstream or downstream direction, the node or routing node may store and/or add to the additional data included with the message at least one of identification of the selected routing node to which it transmitted the message, identification of the message, and identification of the node or routing node from which it received the identified message. Identification of a message can be at least one of a unique identifier and a topic associated with the message. This information can be stored for a limited amount of time.

In embodiments, when a destination node receives a first message sent upstream by a first node, it replies to the first node with a reply message. The reply message is routed downstream, meaning in a direction away from the head node, to the first node. In embodiments, the first message includes additional data that includes route information that lists nodes along the route taken from the first node to the destination node. The route information is included in the additional data, and the reply message is sent along the route in reverse.

Figure 5:
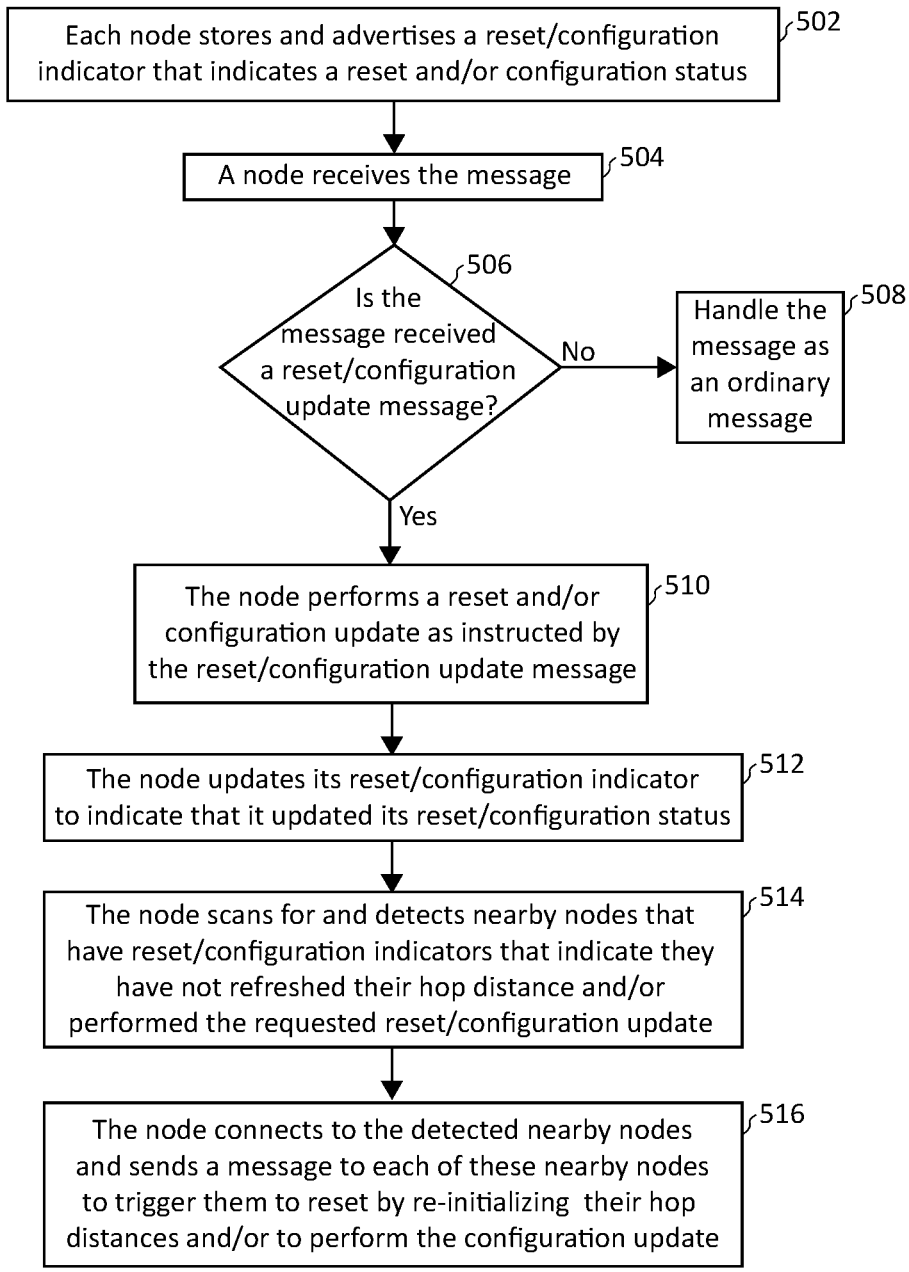
FIG. 5 is a flowchart showing example operations performed by the mesh network and its nodes in accordance with embodiments of the present disclosure.

FIG. 5 shows a flowchart 500 of example operations of a method performed by a mesh network and its nodes, such as network 100 and nodes 101 shown in FIG. 1. A head node, such as head node 104, can transmit a configuration update or reinitialization message, such as with an update for updating software or firmware. The head node can send a configuration update or reinitialization message along a route that should be used by all nodes along the route to perform a configuration process, without the need for the head node to send the configuration update or reinitialization message multiple times to each node along the route individually. During a configuration process, software executed by a first portion of the nodes may be updated before a second portion of the nodes of the mesh network, such that the first and second portions of nodes may be using different versions of the software. During a reinitialization process, the node is triggered to reinitialize its hop distance.

At operation 502, each of the nodes of the network mesh store and advertise a reinitialization/configuration indicator that indicates a reinitialization and/or configuration status. The term reinitialization/configuration refers to reinitialization and/or configuration. At operation 504, a node of the mesh network receives a message. At operation 506, the node determines whether the message is a reinitialization/configuration update message. In embodiments, the determination at operation 506 can include determining whether the message is received from an upstream node that has a lower hop distance than the second node, meaning it may originate from the head and thus may be a reinitialization/configuration update message. The message can then be checked further to determine if it is a reinitialization/configuration update message.

If the determination at operation 506 is NO, meaning the message is not a reinitialization/configuration update message, then the message is handled as an ordinary message at operation 508. Operation 508 can include, for example, determining whether the message is an upstream or downstream bound message, based on whether the node that sent the message has a hop distance that is larger or smaller, respectively. If the message is upstream bound, then go to operation 402 of FIG. 4, and if the message is downstream bound, then go to operation 506 or use routing information provided in additional data of the message to route the message to the next node. If the determination at operation 506 is YES, meaning the message is a configuration update message, the method continues at operation 510.

At operation 510, the node performs a reinitialization and/or configuration update as instructed by the reinitialization/configuration update message. At operation 512, the node updates its reinitialization/configuration indicator to indicate that it updated its reinitialization/configuration status. The reinitialization/configuration indicator may be included in the nodes advertisement.

At operation 514, the node scans for and detects nearby nodes that have reinitialization/configuration indicators that indicate they have not refreshed their hop distance and/or performed the requested reinitialization/configuration update. At operation 516, the node connects to the detected nearby nodes and sends a message to each of these nearby nodes to trigger them to be reinitialized by re-initializing their hop distances and/or to perform the configuration update.

During a configuration update, software executed by a first portion of the nodes may be updated before a second portion of the nodes of the mesh network, such that the first and second portions of nodes may be using different versions of the software. Accordingly, when a node selects a routing node, the node can assure that the node it selects to be the routing node advertises a reinitialization/configuration indicator that indicates a reinitialization/configuration status that is the same as the reinitialization/configuration status advertised by the node's reinitialization/configuration indicator.

Figure 6:
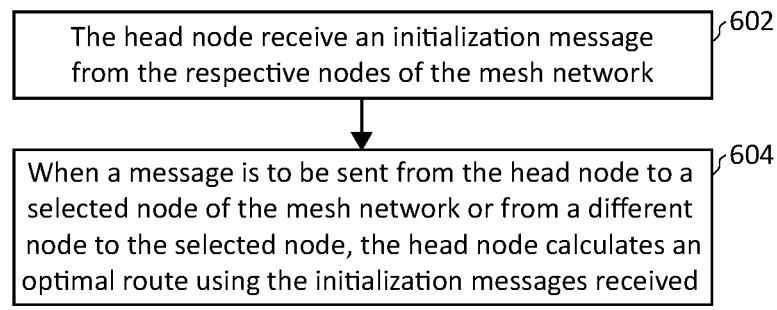
FIG. 6 is a flowchart showing example operations performed by the mesh network and its nodes in accordance with embodiments of the present disclosure.

FIG. 6 shows a flowchart 600 of example operations of a method performed by a head node of the mesh network, such as head node 104 of mesh 100 shown in FIG. 1. At operation 602, the head node receives an initialization message from the respective nodes of the mesh network. The initialization message can include information about the corresponding node, such as the node's identification (e.g., address, such as MAC address, but without limitation to a specific identification), the hop distance of the node, and identification of all nodes determined to be nearby nodes of the node, and the hop distance of each of the nearby nodes. At operation 604, when a message is to be sent from the head node to a selected node of the mesh network or from a different node to the selected node, the head node calculates an optimal route using the initialization messages received.

In embodiments in which the mesh nodes are door locks, such as door locks in a hospitality entity (such as a hotel, motel, or resort), one or more of the above described embodiments can be used to maintain the door locks of the entity. In such an embodiment, each of the mesh nodes described above is a door lock and the head node can be a computer system that is accessible by a variety of hotel employees, such as for managing reservations, the front desk, housekeeping, and security.

There are a variety of operations that can be performed from a head node to a door lock. For example, the front desk of a hotel might desire to reprogram a door lock to accept a certain key card or to not accept a certain key card or to accept an entry via a mobile electronic device (such as a smartphone). In such a case, the front desk of the hotel would use their computer system to direct the head node to issue an instruction to the correct door lock. For example, with reference to FIG. 1, each of the mesh nodes A-J can represent a room number of an associated door lock.

Information from the door locks to the head node might be sent more rarely. There can be audit information transmitted from each door lock to the head node. The audit information can include information as to when the door lock was accessed, by which card the lock was accessed, and at what time.

Because the timeliness of the audit information might not be of high importance to the hospitality entity, it might not be desirable to send this type of information every time the door lock is used. By reducing the number of times this type of information is sent to the head node, the battery life of each door lock can be lengthened. In such a situation, each of the door locks can contain a memory and use the memory to store the audit information. Thereafter, in a periodic manner (such as twice a day), the door lock can send its audit information to the head node, using the embodiments described herein. Other type of information that could be treated as "store and forward" type of information includes battery status, diagnostic information, how long a guest was in the room, the time of use of each lock, room temperature, and each time the room was accessed by staff.

The head node can also send information to all of the door locks at regular intervals, such as calendar date and time synchronization information or instructions to send audit information or diagnostic information. Another type of information that can be sent from the head node to each of the door locks is information that is used by each door lock, such as information to deactivate a master key. Such information is needed by each door lock in the mesh network, so it would be sent in a broadcast format. A broadcast format is a type of message in which each door lock not only retrieves and uses the information, but also forwards the message to the next node in a routing table or to each nearby node(s) that is downstream of the node.

A type of information that may be sent immediately from the door locks to the head node is information referred to as "exceptions." One example of an exception is an unauthorized entry. For example, if the key for room 922 is used for room 926, an exception can be generated and the information is immediately sent to the head node. A similar situation can occur if a master key is used when it is not supposed to be used. For example, a housekeeper who is supposed to be cleaning floor 5 uses her key card to open a door on floor 4. Other types of information that are treated as an exception can include a door being held open for a long period of time, or a locking plan change (e.g., when each key card is set to automatically expire after checkout).

The head node can also send a query to the door locks to request information. For example, if the head node wants to know the last time a specific master key was used, it can send a query to each door lock in the mesh network (or subset thereof). The response to the query can be treated in the same manner as an exception in that the response is immediately transmitted to the head node, as opposed to being stored in the door lock for later transmission during the periodic audit.

There are certain types of messages that may originate in one door lock to be sent to another door lock or to another device that is participating in the peer-peer mesh network without having the head node involved. For example, a door lock could send a message indicating that a guest just entered the room to a thermostat or similar room controlling device or service that is part of a room management system. In response to receiving the data, the thermostat could operate to a set point for comfort rather than to a set point for energy savings. Further, in this example the thermostat or room management device could also operate as a router node, such as router node 106 shown in FIG. 1, with a high-speed connection to the head node. Other example types of devices that originate messages may include sensors, such as smoke detectors, occupancy sensors, door sensors, or the like, to mention a few non-limiting examples. Other examples of router nodes could include lighting systems, lighted exit signs, wireless network routers, fire detection systems, to mention a few non-limiting examples.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of processing systems of nodes 101 of the mesh network 100 shown in FIG. 1 may be implemented or executed by one or more computer systems. For example, the processing system of a node 101 can be implemented using a computer system such as example computer system 702 illustrated in FIG. 7. In various embodiments, computer system 702 may be a stationary or mobile electronic device and/or include one or more of a field-programmable gate array (FPGA), application specific integrated circuit (ASIC), microcontroller, microprocessor, or the like.

Computer system 702 is only one example of a suitable system and is not intended to suggest any limitation as to the scope of use or functionality of embodiments of the disclosure described herein. Regardless, computer system 702 is capable of being implemented and/or performing any of the functionality set forth hereinabove.

Computer system 702 may be described in the general context of computer system-executable instructions, such as program modules, being executed by a computer system. Generally, program modules may include routines, programs, objects, components, logic, data structures, and so on that perform particular tasks or implement particular abstract data types. Computer system 702 may be practiced in distributed data processing environments where tasks are performed by remote processing devices that are linked through a communications network. In a distributed data processing environment, program modules may be located in both local and remote computer system storage media including memory storage devices.

Figure 7:
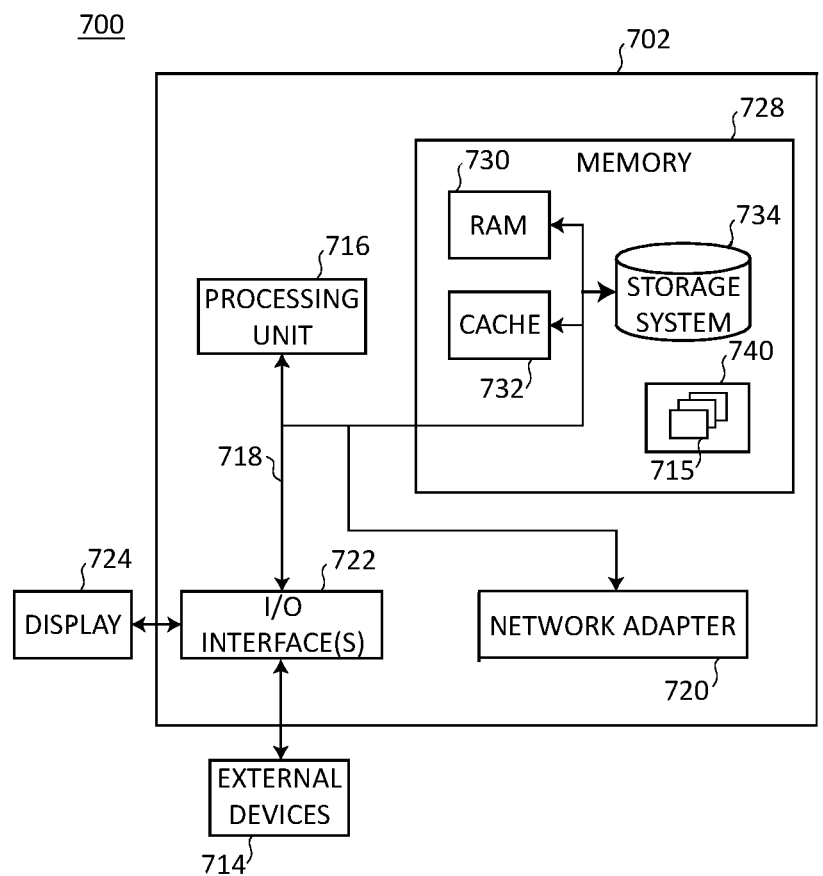
FIG. 7 is a schematic block diagram of a processor system of an example node of the mesh network, in accordance with an illustrative embodiment of the present disclosure.

Computer system 702 is shown in FIG. 7 in the form of a general-purpose computing device. The components of computer system 702 may include, but are not limited to, one or more processors or processing units 716, a system memory 728, and a bus 718 that couples various system components including system memory 728 to processor 716.

Computer system 702 typically includes a variety of computer system readable media. Such media may be any available media that is accessible by the processing system of a node 101, and it includes both volatile and non-volatile media, removable and non-removable media.

System memory 728 can include computer system readable media in the form of volatile memory, such as random access memory (RAM) 730 and/or cache memory 732. Computer system 702 may further include other removable/non-removable, volatile/non-volatile computer system storage media. By way of example only, storage system 734 can be provided for reading from and writing to a non-removable, non-volatile magnetic media. In such instances, each can be connected to bus 718 by one or more data media interfaces. As will be further depicted and described below, memory 728 may include at least one program product having a set (e.g., at least one) of program modules that are configured to carry out the functions of embodiments of the disclosure.

Program/utility 740, having a set (at least one) of program modules 715 may be stored in memory 728 by way of example, and not limitation, as well as an operating system, one or more application programs, other program modules, and program data. Each of the operating system, one or more application programs, other program modules, and program data or some combination thereof, may include an implementation of communicating with a mesh networking environment. Program modules 715 generally carry out the functions and/or methodologies of embodiments of the disclosure as described herein.

Computer system 702 may also communicate with one or more external computing devices 714, e.g., a mobile device. Such communication can occur via an I/O interface 722, such as a Bluetooth interface. Still yet, computer system 702 can communicate with one or more networks such as a local area network (LAN), a general wide area network (WAN), and/or a public network (e.g., the Internet) via network adapter 720. As depicted, network adapter 720 and I/O interface 722 can communicate with the other components of computer system 702 via bus 718. It should be understood that although not shown, other hardware and/or software components could be used in conjunction with computer system 702. The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in a different order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Potential advantages provided by the disclosed methods include automatic configuration of the mesh network when a mesh or router node is added, removed, fails, or moves. The mesh nodes can automatically send upstream messages to the head node, such as hotel locks sending a status messages reporting battery life status. The head node can broadcast messages to the hotel locks or to individual hotel locks using minimal and easily reconfigurable routing information. The head node can determine and send routing suggestions to a source node when the source node wants to send a message downstream to a destination node. Thus, hotel locks can communicate with one another by obtaining routing information provided by the head node 104. The methods described below, offer simplicity of operation of the mesh network, versatility, and conservation of power expended by the nodes, e.g., hotel locks, thus preserving battery life.

The techniques described herein are exemplary, and should not be construed as implying any particular limitation of the certain illustrated embodiments. It should be understood that various alternatives, combinations, and modifications could be devised by those skilled in the art. For example, operations associated with the processes described herein can be performed in any order, unless otherwise specified or dictated by the operations themselves. The present disclosure is intended to embrace all such alternatives, modifications and variances that fall within the scope of the appended claims.

The terms "comprises" or "comprising" are to be interpreted as specifying the presence of the stated features, integers, operations or components, but not precluding the presence of one or more other features, integers, operations or components or groups thereof.

Although the systems and methods of the subject disclosure have been described with respect to the embodiments disclosed above, those skilled in the art will readily appreciate that changes and modifications may be made thereto without departing from the spirit and scope of the certain illustrated embodiments as defined by the appended claims.

What is claimed is:

1. A method of routing communication between nodes of a mesh network, the method comprising:
   each node of the mesh network advertising a hop distance relative to a head of the mesh network, the hop distance being a measure of how many hops a node of the mesh network is from a head node of the mesh network, the head node being a node of the mesh network that controls all the other nodes of the mesh network;
   selecting, by a node of the mesh, a routing node, the routing node being a node of one or more nearby nodes, the at least one nearby node being included in the mesh network and within a distance capable of point-point communication with a node to which it is nearby;
   transmitting, by the node, a message to the routing node;
   receiving, by the routing node, the message;
   until the routing node that received the message is the head node or a destination node as indicated by identification data in the message, iteratively repeating:
      selecting, by the routing node, a next routing node of one or more nearby nodes;
      transmitting, by the routing node, the message by the routing node to the next routing node;
      receiving the message by the next routing node; and
      if the message is received, treating the next routing node that received the message as the routing node,
   wherein the node is initialized or reinitialized in response to at least one of adding the node to the mesh network, physically moving the node relative to the mesh network, and receiving a request to reinitialize the node, wherein the initializing or reinitializing comprises:
      scanning, by the node, a hop distance advertised by at least one respective nearby node:
      determining, by the node, a minimum hop distance of the scanned at least one hop distance; and
      advertising, by the node, the minimum hop distance+1.

2. The method of claim 1, wherein the advertising, scanning, transmitting, and receiving is performed using Bluetooth protocol.

3. The method of claim 1, wherein selecting the routing node by the node or selecting the next routing node by the routing node, further comprises:
   scanning to obtain a hop distance advertised by nearby nodes which are the one or more nearby nodes of the node or of the routing node; and selecting to be the routing node or the next routing node, a node of the nearby nodes based on at least one of advertisement of a minimum hop distance that is lower than the node's or routing node's advertised hop distance by the nearby nodes, signal strength of advertisements by the nearby nodes and/or satisfies a load balancing criterion associated with the nearby nodes.

4. The method of claim 1, further comprising:
receiving, by a head node of the mesh network from the respective nodes of the mesh network, an initialization message, wherein the initialization message includes identification of the node, the hop distance of the node, and identification of all nodes determined to be nearby nodes of the node, the head node being a node of the mesh network that controls all the other nodes of the mesh network; and
calculating using the initialization messages received, by the head node, an optimal route from at least one of the head node to a selected node of the mesh network or from a first node to a second node of the mesh network.

5. The method of claim 1, wherein the destination node is the head node and wherein selecting the routing node by the node or selecting the next routing node by the routing node, further comprises:
selecting to be the routing node or the next routing node, a node of the one or more nearby nodes that advertises a hop distance that is lower than the node's or routing node's advertised hop distance.

6. A method of routing communication between nodes of a mesh network, the method comprising:
each node of the mesh network advertising a hop distance relative to a head of the mesh network, the hop distance being a measure of how many hops a node of the mesh network is from a head node of the mesh network, the head node being a node of the mesh network that controls all the other nodes of the mesh network;
selecting, by a node of the mesh, a routing node, the routing node being a node of one or more nearby nodes, the at least one nearby node being included in the mesh network and within a distance capable of point-point communication with a node to which it is nearby;
transmitting, by the node, a message to the routing node;
receiving, by the routing node, the message;
until the routing node that received the message is the head node or a destination node as indicated by identification data in the message, iteratively repeating:
selecting, by the routing node, a next routing node of one or more nearby nodes;
transmitting, by the routing node, the message by the routing node to the next routing node:
receiving the message by the next routing node; and
if the message is received, treating the next routing node that received the message as the routing node,
wherein the node and each routing node stores at least one of identification of the routing node to which it transmitted the message, identification of the message, and identification of the node or routing node from which it received the identified message, wherein identification of the message is at least one of a unique identifier and a topic associated with the message, wherein identification of the node is at least one of a unique identifier and a topic to which the node subscribes.

7. The method of claim 6, further comprising:
receiving, by a second node of the network mesh, a second message;
determining, by the second node, whether identification is stored of a node from which it received a first message having an identification that matches identification of the second message; and
transmitting, by the second node, if it is determined that the identification matches, the second message to the node or routing node from which it received the first message.

8. The method of claim 7, further comprising:
transmitting, at least once by each node, an initialization message that identifies the node each time the node is added to the mesh network, each time the node is physically moved relative to the mesh network, each time the node is reinitialized, or at periodic intervals.

9. The method of claim 8, wherein the initialization message further includes identification of all nearby nodes and the hop distance advertised by the node.

10. A method of routing communication between nodes of a mesh network, the method comprising:
each node of the mesh network advertising a hop distance relative to a head of the mesh network, the hop distance being a measure of how many hops a node of the mesh network is from a head node of the mesh network, the head node being a node of the mesh network that controls all the other nodes of the mesh network;
selecting, by a node of the mesh, a routing node, the routing node being a node of one or more nearby nodes, the at least one nearby node being included in the mesh network and within a distance capable of point-point communication with a node to which it is nearby;
transmitting, by the node, a message to the routing node;
receiving, by the routing node, the message;
until the routing node that received the message is the head node or a destination node as indicated by identification data in the message, iteratively repeating:
selecting, by the routing node, a next routing node of the routing node's one or more nearby nodes;
transmitting, by the routing node, the message by the routing node to the next routing node:
receiving the message by the next routing node; and
if the message is received, treating the next routing node that received the message as the routing node,
wherein selecting the routing node by the node or selecting the next routing node by the routing node, further comprises:
scanning to obtain a hop distance advertised by nearby nodes which are the one or more nearby nodes of the node or of the routing node; and
selecting to be the routing node or the next routing node, a node of the nearby nodes based on at least one of advertisement of a minimum hop distance that is lower than the node's or routing node's advertised hop distance by the nearby nodes, signal strength of advertisements by the nearby nodes and/or satisfies a load balancing criterion associated with the nearby nodes; and
storing the selected routing node to which the message was successfully transmitted.

11. The method of claim 10, further comprising initializing the node, including, in response to at least one of adding the node to the mesh network, physically moving the node relative to the mesh network, and receiving a request to reinitialize the node, wherein the reinitializing comprises:
scanning, by the node, a hop distance advertised by at least one respective nearby node;

determining, by the node, a minimum hop distance of the scanned at least one hop distance; and advertising, by the node, the minimum hop distance+1.

12. The method of claim 10, wherein if two or more of the one or more nearby nodes have the same advertised hop distance, selecting the routing node includes selecting a node of the two or more nearby nodes that was previously selected by the node.

13. A method of routing communication between nodes of a mesh network, the method comprising:
   each node of the mesh network advertising a hop distance relative to a head of the mesh network, the hop distance being a measure of how many hops a node of the mesh network is from a head node of the mesh network, the head node being a node of the mesh network that controls all the other nodes of the mesh network;
   selecting, by a node of the mesh, a routing node, the routing node being a node of one or more nearby nodes, the at least one nearby node being included in the mesh network and within a distance capable of point-point communication with a node to which it is nearby;
   transmitting, by the node, a message to the routing node;
   receiving, by the routing node, the message;
   until the routing node that received the message is the head node or a destination node as indicated by identification data in the message, iteratively repeating:
      selecting, by the routing node, a next routing node of one or more nearby nodes;
      transmitting, by the routing node, the message by the routing node to the next routing node:
      receiving the message by the next routing node; and
      if the message is received, treating the next routing node that received the message as the routing node; and
   the routing node, at each iteration, adding identification of a node from which the message was received to routing information included with the message.

14. A method of routing communication between nodes of a mesh network, the method comprising:
   each node of the mesh network advertising a hop distance relative to a head of the mesh network, the hop distance being a measure of how many hops a node of the mesh network is from a head node of the mesh network, the head node being a node of the mesh network that controls all the other nodes of the mesh network;
   selecting, by a node of the mesh, a routing node, the routing node being a node of one or more nearby nodes, the at least one nearby node being included in the mesh network and within a distance capable of point-point communication with a node to which it is nearby;
   transmitting, by the node, a message to the routing node;
   receiving, by the routing node, the message;
   until the routing node that received the message is the head node or a destination node as indicated by identification data in the message, iteratively repeating:
      selecting, by the routing node, a next routing node of one or more nearby nodes;
      transmitting, by the routing node, the message by the routing node to the next routing node:
      receiving the message by the next routing node; and
      if the message is received, treating the next routing node that received the message as the routing node;
   each of the nodes of the network mesh advertising a reinitialization/configuration indicator that indicates a reinitialization and/or configuration status;
   receiving, by the node, a second message;
   determining, by the node, if the second message received is a reinitialization or configuration update message;
   performing, by the node, a configuration update or reinitialization process as instructed by the reinitialization or configuration update message; and
   updating, by the node, its reinitialization/configuration indicator to indicate that the reinitialization and/or configuration status is updated.

15. The method of claim 14, wherein selecting the routing node includes selecting a node to be the routing node that advertises a reinitialization/configuration indicator that indicates a reinitialization and/or configuration status that is the same as the reinitialization and/or configuration status advertised by the node's reinitialization/configuration indicator.

16. The method of claim 14, further comprising:
   scanning and detecting, by the node, each nearby node that has a reinitialization/configuration indicator that indicates it did not perform a reinitialization or configuration update process;
   sending at least one of the second message or a new reinitialization or configuration update message, by the node, to the detected nearby nodes to trigger each of the detected nearby nodes to perform a reinitialization or configuration update process.

17. A node of a mesh network having a plurality of nodes, the node comprising:
   a memory configured to store instructions;
   a processor in communication with the memory, wherein the processor upon execution of the instructions is configured to:
   advertise a hop distance relative to a head of the mesh network, the hop distance being a measure of how many hops a node of the mesh network is from a head node of the mesh network, the head node being a node of the mesh network that controls all the other nodes of the mesh network, wherein each node of the mesh network is configured to advertise a hop distance relative to the head of the mesh network; and
   determine whether a nearby node of one or more nearby nodes is disposed upstream or downstream relative to the node based on the node's advertised hop distance and a hop distance advertised by the nearby node, wherein the nearby node is included in the mesh network and disposed within a distance capable of point-point communication with the node, an upstream position is indicated when the nearby node has a lower hop distance than the node, and a downstream is indicated when the nearby node has a hop distance that is higher than the node;
   select a routing node, the routing node being a node of the one or more nearby nodes, the one or more nearby nodes being included in the mesh network and within a distance capable of point-point communication with a node to which it is nearby;
   transmit a message to the routing node, wherein the routing node receives the message, and wherein it is iteratively repeated until the routing node that received the message is the head node or a destination node as indicated by identification data in the message:
      select, by the routing node, a next routing node of the routing node's one or more nearby nodes;
      transmit, by the routing node, the message by the routing node to the next routing node; and
      receive the message by the next routing node; and
   if the message is received, treat the next routing node that received the message as the routing node, wherein, when selecting the routing node by the node the processor upon execution of the instructions is further configured to, or when selecting the next routing node by the routing node, routing node is configured to:
- scan to obtain a hop distance advertised by nearby nodes which are the one or more nearby nodes of the node or of the routing node; and
- select to be the routing node or the next routing node, a node of the nearby nodes based on at least one of advertisement of a minimum hop distance that is lower than the node's or routing node's advertised hop distance by the nearby nodes, signal strength of advertisements by the nearby nodes and/or satisfies a load balancing criterion associated with the nearby nodes; and
- store the selected routing node to which the message was successfully transmitted.

18. One or more non-transitory computer readable storage mediums and one or more computer programs embedded therein, first computer programs of the computer programs comprising instructions, which when executed by a computer system of a node of a mesh network having a plurality of nodes, cause the computer system of the node to:
- advertise a hop distance relative to a head of the mesh network, the hop distance being a measure of how many hops a node of the mesh network is from a head node of the mesh network, the head node being a node of the mesh network that controls all the other nodes of the mesh network, wherein each node of the mesh network is configured to advertise a hop distance relative to the head of the mesh network; and
- determine whether a nearby node of one or more nearby nodes is disposed upstream or downstream relative to the node based on the node's advertised hop distance and a hop distance advertised by the nearby node, wherein the nearby node is included in the mesh network and disposed within a distance capable of point-point communication with the node, an upstream position is indicated when the nearby node has a lower hop distance than the node, and a downstream is indicated when the nearby node has a hop distance that is higher than the node
- select a routing node, the routing node being a node of the one or more nearby nodes, the at one or more nearby node being included in the mesh network and within a distance capable of point-point communication with a node to which it is nearby; and
- transmit a message to the routing node, wherein second computer programs of the computer programs comprise instructions, which when executed by a second computer system of the routing node, cause the second computer system to iteratively repeat, until the routing node is the head node or a destination node as indicated by identification data in the message:
- select a next routing node of the routing node's one or more nearby nodes;
- transmit the message by the routing node to the next routing node, wherein the message is received by the next routing node; and
- add the identification of a node from which the message was received to routing information included with the message.

* * * * *